G. W. DOVER.
LATHE TOOL.
APPLICATION FILED APR. 3, 1920.
1,366,366.
Patented Jan. 25, 1921.
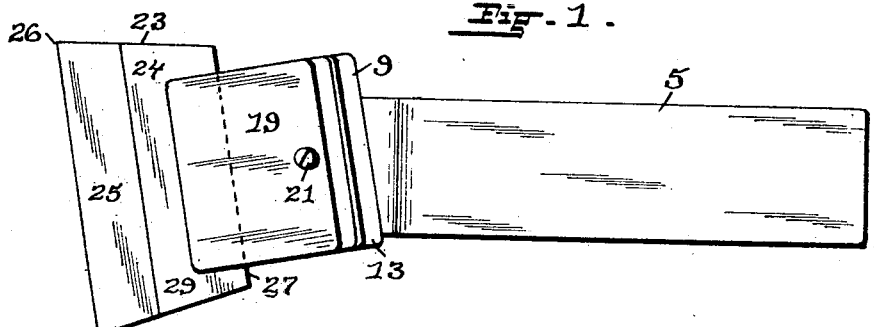
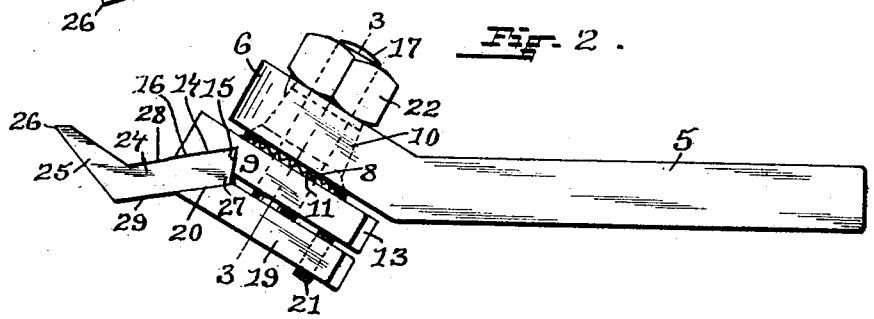
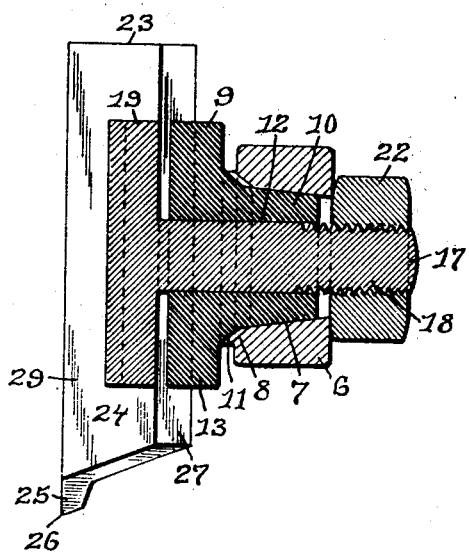
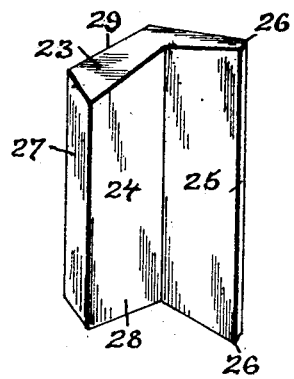
INVENTOR:
George William Dover
By Chas. H. Luther
ATTORNEY

UNITED STATES PATENT OFFICE.

GEORGE WILLIAM DOVER, OF CRANSTON, RHODE ISLAND.

LATHE-TOOL.

1,366,366.  Specification of Letters Patent.  Patented Jan. 25, 1921.

Application filed April 3, 1920. Serial No. 371,096.

*To all whom it may concern:*

Be it known that I, GEORGE WILLIAM DOVER, a citizen of the United States, residing at Cranston, in the county of Providence and State of Rhode Island, have invented a new and useful Improvement in Lathe-Tools, of which the following is a specification.

This invention has reference to an improvement in lathe tools and more particularly to an improvement in the lathe tool shown in my U. S. Patent No. 1,328,947, granted to me January 27, 1920.

The object of my invention is to improve the construction of such a lathe tool, whereby the cutting member is at a transverse angle relative to the holder for clearance, the tool may be used as a right hand or a left hand tool and the cutting member always has the same required clearance, when in use, either as a right or left hand tool.

My invention consists in the peculiar and novel construction of a lathe tool having an adjustable and detachable two point cutting member bent at a transverse angle to the holder, for clearance, when used either as a right or left hand tool, said lathe tool having details of construction, as will be more fully set forth hereinafter and claimed.

Figure 1 is a side view of my improved lathe tool.

Fig. 2 is a top view of the lathe tool.

Fig. 3 is an enlarged transverse sectional view through the lathe tool, taken on line 3. 3 of Fig. 2, and Fig. 4 is a perspective view of the cutting member removed from the holder.

In the drawing 5 indicates a holder in the form of a rectangular shaped bar having a sidewise bent end 6 in which is a round transverse tapered hole 7, the face end of which has a circular series of corrugations 8. The holder 5 may be straight if desired. A rotatable adjusting member 9 has a round tapered hub 10 which fits in the tapered hole 7, a circular series of corrugations 11 at the base of the hub which fit into the corrugations 8, a central bolt hole 12, which extends through the hub 10 and a rectangular shaped head 13 in the face of which is an approximately vertical off center V shaped groove 14. This groove 14 has one side 15 at an angle of forty-five degrees and the other side 16 at an angle of approximately forty degrees to the face of the rectangular shaped head 13. A bolt 17 extends through the bolt hole 12 and has a screw-threaded end 18 and a rectangular shaped head 19 the forward edge of which is formed into an angular inwardly extending side 20 having an angle of approximately fifty degrees to the face of the rectangular shaped head 19, the side 20 being in oppositely disposed relation to the side 16 of the groove 14, as shown in Fig. 1. A screw 21 is screw-threaded through the head 19 at one side of the center of the head and bears against the face of the head 13 and a nut 22 is in screw-thread engagement with the screw-threaded end 18 of the bolt 17 and bears against the bent end 6 of the holder 5. A two point bar shaped cutting member 23 is constructed to have a body portion 24 by which the cutting member is secured by clamping the body portion 24 between the heads 13 and 19, in the V shaped groove 14, and a cutting portion 25 bent at a transverse angle to the body portion and having a cutting point 26 at each end, as shown in Figs. 2 and 4. The cutting portion 25 is bent at an angle of approximately seventy degrees to the center line of the bolt 17, for clearance, as shown in Fig. 2. The body portion 24 has a flat rear edge 27 which fits against the side 15 of the groove 14, an angular side 28 which fits against the side 16 of the groove 14 and an angular side 29 which fits against the angular side 20 of the head 19, when the cutting member is clamped in place, as shown in Fig. 2. The cutting member tapers gradually from the rear edge 27 to the cutting edge.

When in use the cutting member 23 is clamped between the heads 13 and 19, it may be adjusted up or down and at an angle and by tightening the nut 22, after adjustment, the cutting member is rigidly secured between the clamping heads and is also held from turning by the corrugations 8 and 11. By adjusting the screw 21 the angular side 20 of the head 19 may be adjusted to fit the angular side 29 of the cutting member. The cutting member may be placed at any angle required for lathe or planer use, the tool may be used either right or left hand and in either position there is always the required clearance of the cutting member.

It is evident that the cutting points of the cutting member could be of any shape desired and other details of construction could be varied within the scope of the appended claims.

Having thus described my invention, I claim as new:

1. A lathe tool comprising a holding member having a round tapered transverse hole in one end, corrugations in the face end of the hole, a rotatable adjusting member having a round tapered hub in the hole, corrugations at the base of the hub and engaging the corrugations in the hole, a head having in its face an off center V shaped groove and a bolt hole extending through the hub, a bolt extending through the bolt hole and having a screw-threaded end and a head having an angular forward side, the V shaped groove and the angular forward side forming a cutting member clamping opening, a cutting member having a body portion with angular sides which fit in and are clamped in the clamping opening between the heads, a cutting portion bent at a transverse angle to the body portion and a nut on the screw-threaded end of the bolt and bearing against the holding member.

2. In a lathe tool according to claim 1 an adjusting member having a head, a bolt having a head and an adjusting screw screw-threaded through the head of the bolt, and engaging with the head of the adjusting member for the purpose as described.

3. In a lathe tool according to claim 1 the cutting member having a body portion with angular sides and a cutting portion bent at a transverse angle to the body portion and having a cutting point at each end, the cutting member tapering gradually from its rear edge to its cutting edge, as described.

In testimony whereof, I have signed my name to this specification.

GEORGE WILLIAM DOVER.